(12) United States Patent
Lucovsky et al.

(10) Patent No.: US 8,819,536 B1
(45) Date of Patent: Aug. 26, 2014

(54) SYSTEM AND METHOD FOR FORMING MULTI-USER COLLABORATIONS

(75) Inventors: Mark Lucovsky, Montecito, CA (US); Carl P. Sjogreen, San Francisco, CA (US); Salar A. Kamangar, Palo Alto, CA (US); Adam Bosworth, Mercer Island, WA (US)

(73) Assignee: Google Inc., Mountain View, CA (US)

( * ) Notice: Subject to any disclaimer, the term of this patent is extended or adjusted under 35 U.S.C. 154(b) by 61 days.

(21) Appl. No.: 13/227,417

(22) Filed: Sep. 7, 2011

Related U.S. Application Data (63) Continuation of application No. 11/292,905, filed on Dec. 1, 2005, now abandoned.

(51) Int. Cl.
*G06F 17/00* (2006.01)
(52) U.S. Cl.
USPC .......................................... 715/205; 715/758
(58) Field of Classification Search
CPC ....................................................... H04L 12/16
USPC .......................................................... 715/205
See application file for complete search history.

(56) References Cited

U.S. PATENT DOCUMENTS

| | | | |
|---|---|---|---|
| 6,434,599 B1 | 8/2002 | Porter ............................ | 709/204 |
| 6,446,113 B1 | 9/2002 | Ozzie et al. .................... | 709/204 |
| 6,718,313 B1 | 4/2004 | Lent et al. ........................ | 705/38 |
| 6,732,364 B1 | 5/2004 | Bhaskaran et al. ........... | 719/318 |
| 6,745,178 B1 | 6/2004 | Emens et al. ...................... | 707/3 |
| 6,766,374 B2 | 7/2004 | Trovato et al. ................ | 709/227 |
| 6,950,852 B1 | 9/2005 | Kobayaghi et al. ........... | 709/204 |
| 7,047,279 B1 | 5/2006 | Beams et al. .................. | 709/204 |
| 7,209,475 B1 | 4/2007 | Shaffer et al. .................. | 370/355 |
| 7,454,470 B1 * | 11/2008 | Isaacs et al. .................... | 709/206 |
| 7,542,902 B2 | 6/2009 | Scahill et al. .................. | 704/251 |
| 7,606,856 B2 | 10/2009 | Singh et al. ..................... | 709/202 |
| 7,636,779 B2 | 12/2009 | Hayashi et al. ............... | 709/224 |
| 7,970,664 B2 | 6/2011 | Linden et al. | |
| 2001/0056465 A1 | 12/2001 | Aiso .............................. | 709/203 |
| 2002/0103647 A1 * | 8/2002 | Houplain ....................... | 704/260 |
| 2002/0152101 A1 | 10/2002 | Lawson et al. ..................... | 705/6 |
| 2003/0021238 A1 | 1/2003 | Corneliussen et al. ........ | 370/260 |
| 2003/0023677 A1 * | 1/2003 | Morison Zuill et al. ....... | 709/203 |

(Continued)

FOREIGN PATENT DOCUMENTS

KR 2004104060 A 12/2004

OTHER PUBLICATIONS

Buik-Aghai, "Visualization of Interaction in an Online Collaboratoin Environment", p. 228-235, 2005, URL<http://ieeexplore.ieee.org/stamp/stamp.jsp?tp=&arnumber=1553317>.*

(Continued)

*Primary Examiner* — Doug Hutton, Jr.
*Assistant Examiner* — Mustafa Amin
(74) *Attorney, Agent, or Firm* — Patent Law Work LLP (57) ABSTRACT

A method of forming a multi-user online collaboration includes automatically receiving and processing a plurality of communications, including comparing the plurality of communications with collaboration launch criteria. When a received communication meets the collaboration launch criteria, a participant in the communication is invited to generate a multi-user online collaboration. In some embodiments, the method includes identifying a group of communications, comparing the group of communications with the collaboration launch criteria to produce a comparison result, and generating a collaborative metric in accordance with the comparison result.

30 Claims, 6 Drawing Sheets

(56) References Cited

U.S. PATENT DOCUMENTS

| | | | |
|---|---|---|---|
| 2003/0070176 A1 | 4/2003 | Parker et al. | 725/105 |
| 2003/0135565 A1 | 7/2003 | Estrada | 709/206 |
| 2003/0225833 A1 | 12/2003 | Pilat et al. | 709/204 |
| 2004/0083263 A1 | 4/2004 | Richardson et al. | 709/204 |
| 2004/0098449 A1 | 5/2004 | Bar-Lavi et al. | 709/202 |
| 2004/0260701 A1 | 12/2004 | Lehikoinen et al. | 707/10 |
| 2004/0267730 A1 | 12/2004 | Dumais et al. | 707/3 |
| 2005/0086211 A1 | 4/2005 | Mayer | 707/3 |
| 2005/0125246 A1* | 6/2005 | Muller et al. | 705/1 |
| 2005/0144228 A1 | 6/2005 | Rokosz et al. | 709/204 |
| 2005/0154693 A1 | 7/2005 | Ebert | 707/1 |
| 2005/0171799 A1 | 8/2005 | Hull et al. | |
| 2005/0276479 A1 | 12/2005 | Goldberg et al. | 382/181 |
| 2006/0004775 A1 | 1/2006 | Kobayaghi et al. | 707/10 |
| 2006/0080432 A1 | 4/2006 | Spataro et al. | 709/224 |
| 2006/0143214 A1 | 6/2006 | Teicher | |
| 2006/0167747 A1 | 7/2006 | Goodman et al. | 705/14 |
| 2006/0176831 A1 | 8/2006 | Greenberg et al. | 370/260 |
| 2006/0218577 A1 | 9/2006 | Goodman et al. | 725/32 |
| 2007/0016585 A1 | 1/2007 | Nickell et al. | 707/10 |
| 2007/0073810 A1* | 3/2007 | Adams et al. | 709/205 |
| 2007/0083520 A1 | 4/2007 | Shellen et al. | 707/10 |
| 2007/0112965 A1 | 5/2007 | Eftis et al. | 709/227 |
| 2007/0116227 A1 | 5/2007 | Vitenson et al. | 379/207.02 |
| 2008/0115068 A1 | 5/2008 | Smith | 715/758 |
| 2008/0235018 A1 | 9/2008 | Eggen et al. | 704/251 |
| 2010/0205541 A1 | 8/2010 | Rapaport et al. | 715/753 |

OTHER PUBLICATIONS

"Implementing Rich Collaboration Infrastructure Using Microsoft Windows SharePoint Services and Microsoft Office SharePoint Portal Server 2003," White Paper, Microsoft Corporation, Oct. 2003, 14 pages.

"Deciding When to Deploy Microsoft Windows SharePoint Services and Microsoft Office SharePoint Portal Server 2003," White Paper, Microsoft Corporation, Oct. 2004, 10 pages.

Lee, A., et al., "Developing Web-Based Collaborative Applications—Social and Technical Issues," Human-Computer Interactions, Interact '01, Jul. 2001, pp. 835-836.

* cited by examiner

```
700
Page Definition:
Nav Region Definition;
Title Definition;
Region 1 definition (widget ref, source ref, etc.)
Region 2 definition (widget ref, source ref, etc.)
...
```

Compose Mail | [Search Mail] | more actions ... | Launch New Collaboration

Categories
- Inbox
- Starred
- Sent Mail
- Drafts
- All Mail
- Spam
- Trash

Labels
- Label 1
- Label 2
- more...

Searches
- Search 1
- Search 2
- more...

Recent Views
- View 1
- View 2
- more...

Tahoe Trip   Inbox   Label 1  ...  Label X

☆ S3 to Me, S2, S4                    Show Options
Hi, folks:
Mid-term recession is two weeks from now. We should plan something now. Any idea?
-S3
Reply  Reply to All  Forward ☆ Me to S3, S2, S4                    Show Options
How about a ski trip to Lake Tahoe?
Reply  Reply to All  Forward ☆ S2 to Me, S3, S4                    Show Options
Good idea. I have coupons to buy cheap lift tickets. What about lodging and transportation?
Reply  Reply to All  Forward ☆ S4 to Me, S2, S3                    Show Options
Sorry that I can't make it due to a pre-planned event. Hope you guys have a good break.
-S4
Reply  Reply to All  Forward ☆ Me to S3, S2                    Show Options
I have a SUV. So we can save a few bucks from car rental.
Reply  Reply to All  Forward ☆ S3 to Me, S2                    Show Options
Fantastic! So I will do some research on lodging. Feel free to recommend your favorite places. BTW, we need more input on other logistic issues, food, equipments, etc.
-S3
Reply  Reply to All  Forward 🗔 New window
🖶 Print
⊞ Collapse all Sponsored Links

Tahoe
AAA Approved Vacation Rentals. Homes, Condos & Cabins - All Sizes!

Car Rental Deals
Before You Rent, Check Out These Specials from Top Companies!

Ski Tickets
Great deals on new and used items. Search for ski tickets now! -aff More Links ...

Figure 8

SYSTEM AND METHOD FOR FORMING MULTI-USER COLLABORATIONS

RELATED APPLICATION

This is a continuation of U.S. patent application Ser. No. 11/292,905, filed Dec. 1, 2005 now abandoned, entitled "System and Method for Forming Multi-User Collaborations," which is hereby incorporated by reference in its entirety.

TECHNICAL FIELD

The present invention relates generally to communications within computer network systems, and in particular to forming multi-user online collaborations.

BACKGROUND

Online collaboration tools can permit a community of users to collaborate on projects, share information, meet and discuss issues, and make presentations, all online. They can be used with various sizes and types of user communities such as work teams, social networks, and other associations of users. However, a particular user community must be defined and set up by an administrator. The administrator determines and defines the membership of the community as well as members' permissions and rights with respect to a collaboration space. Oftentimes, the administrator will need to modify the membership of the community to reflect various changes in the community and/or permissions with respect to the collaboration space. The administrator also configures and maintains the collaboration space itself. In some instances, the rights and responsibilities of an administrator can be delegated to one or more members of the community. Such collaboration spaces, therefore, tend to require more than an insignificant amount of overhead to set up and maintain.

SUMMARY

According to some embodiments, a method of forming a multi-user online collaboration includes automatically receiving and processing a plurality of communications, including comparing the plurality of communications with a collaboration launch criteria. When a received communication meets the collaboration launch criteria, a participant in the received communication is invited to generate a multi-user online collaboration. In some embodiments, the method includes identifying a group of communications, comparing the group of communications with the collaboration launch criteria to produce a comparison result, and generating a collaborative metric in accordance with the comparison result.

BRIEF DESCRIPTION OF THE DRAWINGS

The aspects of the invention as well as features and advantages thereof will be more clearly understood hereinafter as a result of a detailed description of embodiments of the invention when taken in conjunction with the drawings. Like reference numerals refer to corresponding parts throughout the several views of the drawings.

DESCRIPTION OF EMBODIMENTS

According to some embodiments, a set of users who are already in communication with each other are candidates for forming an online collaboration. The set of users may share a set of common characteristics, which can include, for example, concurrently doing the same task or related tasks, searching and/or browsing for similar information, exchanging messages with each other concerning a particular topic, or playing online games with each other. A shared communication space (e.g., web page, a chatroom, or other space) is dynamically created and the entities in the set are invited to participate in the shared communication space.

Figure 1:
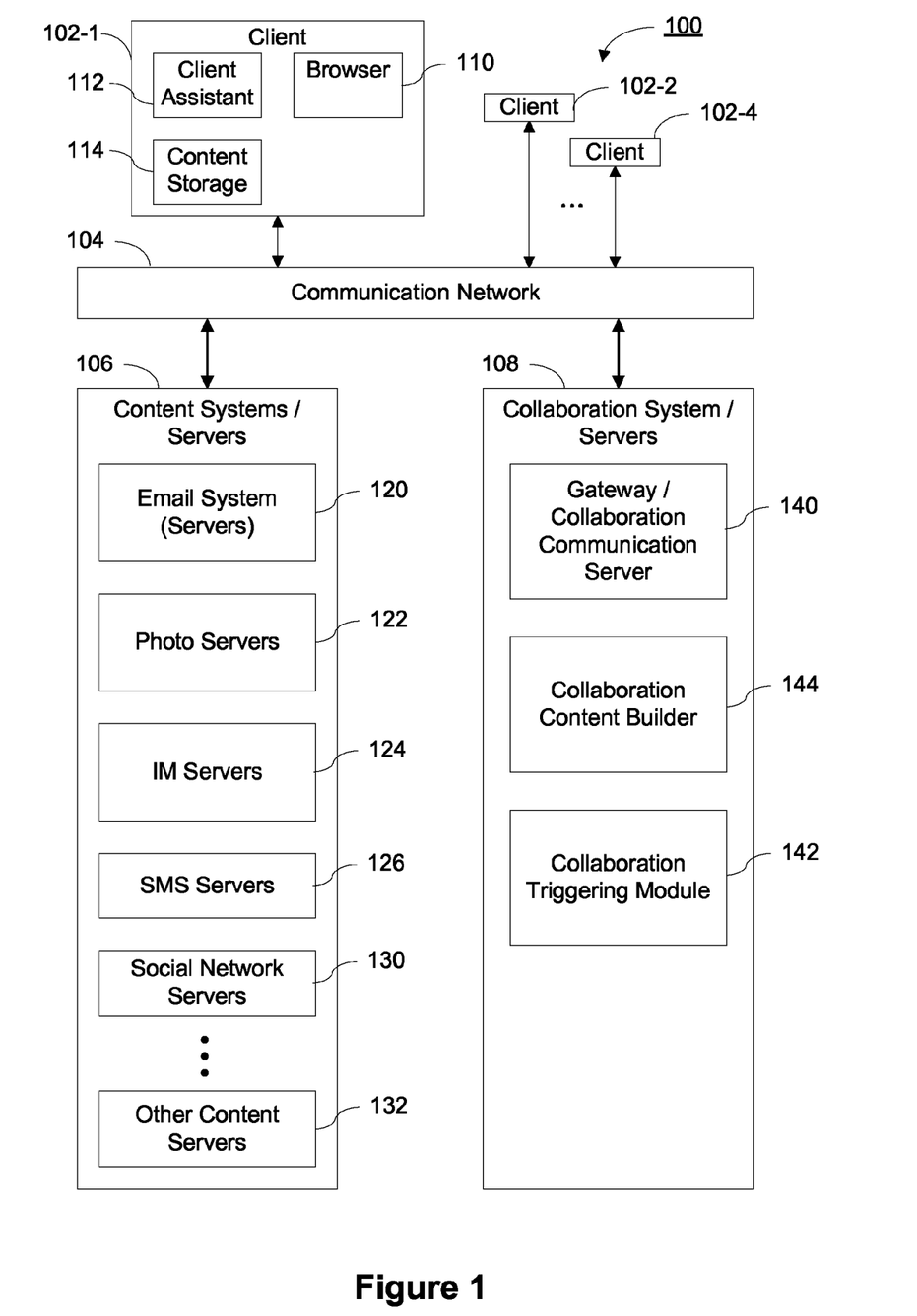
FIG. 1 depicts a distributed system in which new online collaborations between users are instantiated and existing collaborations are maintained, in accordance with some embodiments of the invention.

FIG. 1 illustrates an exemplary environment distributed system 100 in which new online collaborations between users are instantiated and existing collaborations are maintained. The distributed system 100 includes clients 102, a communication network 104, a set of content systems or servers 106, and a collaboration system 108. A client 102 can be any of a number of devices (e.g., a computer, an internet kiosk, a personal digital assistant, a cell phone, a gaming device, a desktop computer, or a laptop computer) and can include one or more client applications 110, a client assistant 112, and memory for locally storing content 114, client data and settings. The client application 110 can be a software application that permits a user to interact with the client 102 and/or network resources to perform one or more tasks. For example, the client application 110 can be a browser (e.g., Firefox), email client, instant messaging client, game application, or other type of application that permits a user to access resources (e.g., web pages and web services) in the content systems 106 and/or exchange information with other clients 102.

The client assistant 112 can perform one or more tasks related to initiating or using an online collaboration. The client assistant 112 can be part of the client application 110, a plug-in to the client application 110, or a stand-alone program. When the client application 110 is a browser, the client assistant 112 may be a program (e.g., a JavaScript program) embedded in a web page or other content received by the client and executed in an environment provided by the browser. In some embodiments the client assistant 112 includes portions of the collaboration triggering module 142, as discussed below.

The communication network 104 can be any local area network (LAN) and/or wide area network (WAN), such as an intranet, an extranet, or the Internet, or any combination of such communication networks. The communication network 104 provides communications between the clients 102 and between the clients, the content systems 106 and the collaboration system 108. In some embodiments, the communication network 104 transports information using the HyperText Transport Protocol (HTTP) via the Transmission Control Protocol/Internet Protocol (TCP/IP). HTTP permits client computers to access various resources on a client 102 and/or available via the communication network 104. The various embodiments of the invention, however, are not limited to the use of any particular protocol. The term "resource" as used throughout this specification refers to any information or service that is accessible via a Uniform Resource Locator (URL) and can be, for example, a web page, a document, a database, an image, a computational object, a search engine, or the like. The information returned by a resource in response to a request sent to a URL may be dynamically generated. The dynamically generated content may be based, at least in part, on one or more parameter-value pairs in the URL.

The content systems 106 may include one or more email systems or servers 120, photo servers 122, instant messaging (IM) servers 124, short message service (SMS) servers 126, social network servers (130), or other content servers 132. While the collaboration system 108 is logically distinct from the content systems 106, in some embodiments the collaboration system 108 may be implemented on and/or integrated with one or more content servers. As discussed below, communications between users of the content systems 106 are automatically received and processed (within user provided or approved constraints) by the collaboration system 108 so as to identify communications that are candidates for providing the basis for starting new online collaborations.

The collaboration system 108 may include collaboration communication server 140, which functions as a gateway to the collaboration system, directing inbound and outbound traffic to appropriate destinations. A collaboration triggering module 142 determines when communications between users of the content systems 106 are consistent with any of a pre-defined set of triggering events or communication patterns, and initiates the formation of an online collaboration when such communications are identified. The collaboration triggering process, and associated mechanisms and systems are described in more detail below.

A collaboration content builder 144 generates web pages, chat rooms, or other forms of online collaborations, pulling in content from a variety of sources, and responds to user commands and inquiries by updating the content presented in the online collaborations. For instance, the collaboration content builder 144 may add to an online collaboration news snippets related to a topic associated with the online collaboration. In another example, the collaboration content builder 144 may add to an online collaboration search engine-generated search results for a query specified by a user of the online collaboration, or it may add search results for a query defined by the collaboration system 108 in accordance with a topic associated with the online collaboration. In yet another example, the collaboration content builder 144 may add events to a calendar in an online collaboration based on explicit commands by a user of the online collaboration or based on information extracted from communications exchanged by the users of the online collaboration.

Figure 2:
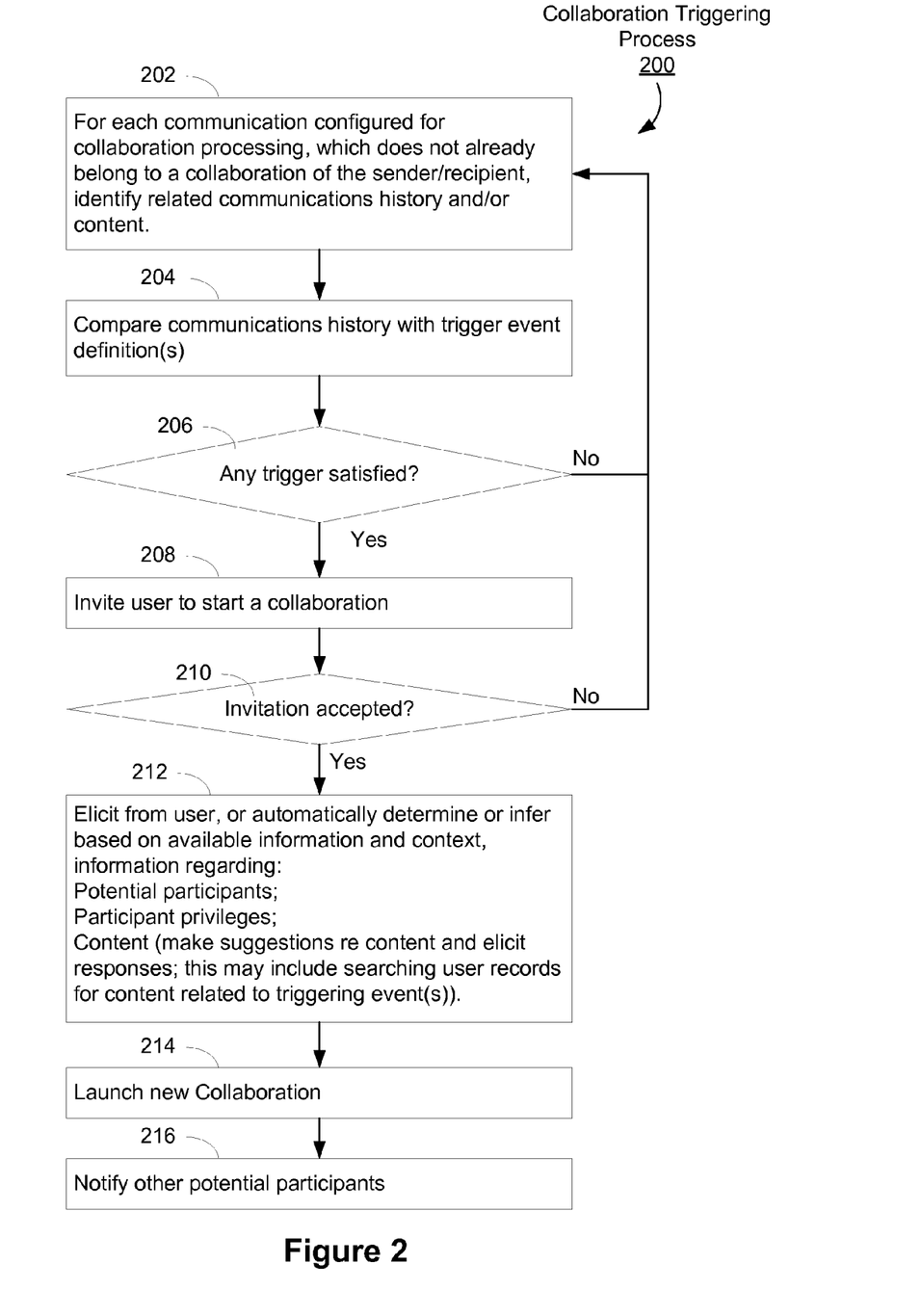
FIG. 2 is a flow chart of a process for determining when to initiate the formation of a new online collaboration, and for dynamically generating an online collaboration when a corresponding user invitation is accepted, in accordance with some embodiments of the invention.

FIG. 2 illustrates an exemplary collaboration triggering process 200 for determining when to create a new online collaboration. In accordance with permissions established for a user, or a set of users, a subset of the user's communications configured for collaboration processing are processed (202). Optionally, communications that already belong to online collaborations may be filtered out from such processing. For each communication not removed from consideration by filtering, the process attempts to identify related communications (herein called the communications history of the communication) and/or related content (e.g., any photos of the user, stored on a photo server, which have titles related to the subject of the communication being processed). If relevant content or communications history is identified, it is compared with one or more trigger event definitions (204). The trigger event definitions specify logical conditions under which launching a collaboration will be suggested to the user whose communications are being processed.

In some embodiments, the collaboration processing operations (202, 204) include identifying a group of communications, comparing the group of communications with collaboration launch criteria, and generating a collaborative metric in accordance with said comparison result. For instance, the collaborative metric may represent how well the group of communications match or satisfy a trigger event definition or pattern. Alternately, the collaborative metric may be a function of the extent to which the group of communications relate to a common topic or conceptual category.

If any of the triggers is satisfied (206-yes), the user is invited to start an online collaboration (208). If the user accepts the invitation (210-yes), additional information may be elicited from the user in order to configure the new online collaboration. For instance, the user may be asked questions about potential participants, including participants in the communication, participants in the identified communications history (see discussion of 202, above), and any additional participants identified by the user or otherwise. The user may be asked questions about participation privileges to be assigned to the participants. Furthermore, the user may be asked questions about content to be included in the online collaboration (212). To minimize the amount of time required to form the online collaboration, and to avoid frustration on the part of the user, the collaboration triggering process may provide suggestions to the user, based on default configurations, and based on participants and content found in the communications history and/or in the related content. If the user has formed online collaborations in the past, the configuration of those online collaborations may be used to determine personalized default or proposed answers to the questions posed by the collaboration triggering process 200.

Once the collaboration triggering process 200 has obtained the information for configuring the online collaboration, the online collaboration is launched (214), for instance by forming one or more web pages that instantiate the online collaboration. When the amount of content or the number of types of information associated with the online collaboration warrant the generation of multiple web pages to instantiate the online collaboration, the online collaboration may include a main web page and one or more additional or child web pages, with the main web page and the other web pages interconnected by hyperlinks. Upon launching of the new online collaboration, the initiating user of the online collaboration may be presented with the main web page of the online collaboration, for instance by redirecting a browser application on the user's client device or computer to the online collaboration's main web page.

In some embodiments, after the online collaboration is launched, other potential participants of the online collaboration are notified of the online collaboration and invited to join (216).

The collaboration triggering process 200 may be performed by a collaboration triggering module 142 in the collaboration system 108 (FIG. 1). However, in some embodiments, portions of the collaboration triggering process 200 may be performed by a client assistant 112 executing on a client 102. For instance, operations 208, 210 and 212 of the process 200 may be performed by executing JavaScript instructions embedded in a web page rendered by a client application or browser 110 in the client 102. In this way, execution of the triggering process is shared by the client 102 and a server in the collaboration system 108. In yet other embodiments, a user can manually invoke the process of initiating a collaboration by clicking on a link, which is generated and displayed on a web page when the possibility of a collaboration is detected.

Figure 3:
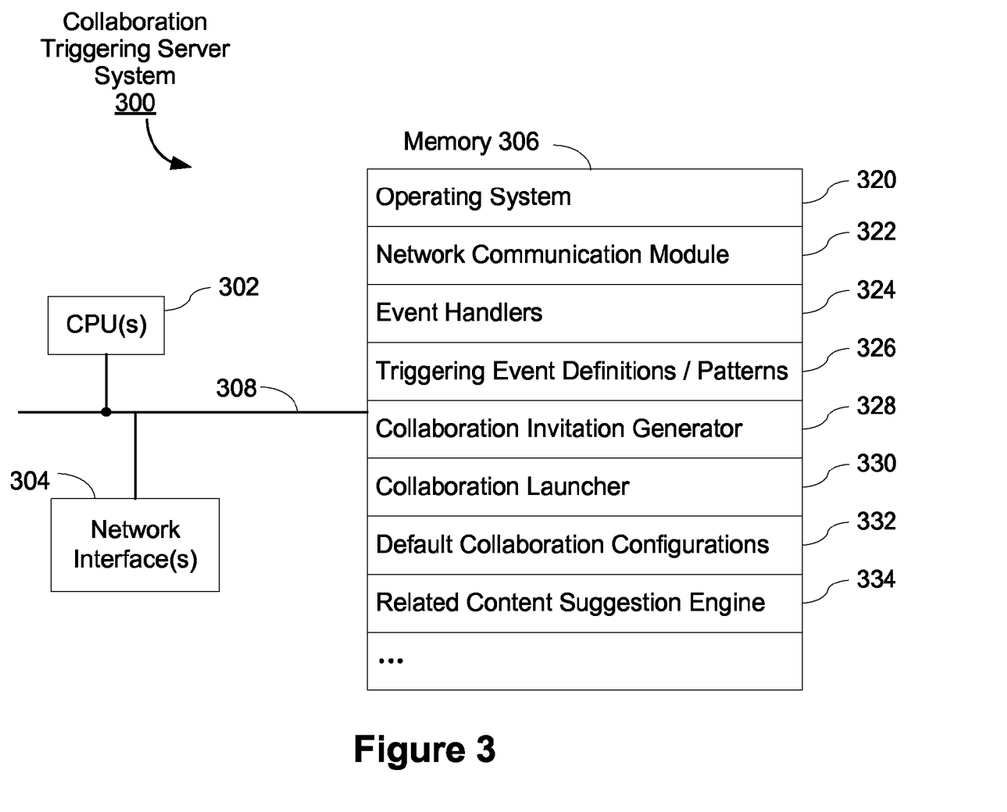
FIG. 3 is a block diagram of an online collaboration triggering server system in accordance with some embodiments of the invention.

FIG. 3 is a block diagram of a collaboration triggering server system 300, which may be an embodiment of the collaboration triggering module 142 of FIG. 1. The collaboration triggering server system 300 includes one or more processing units (CPUs) 302, one or more network or other communications interfaces 304, memory 306, and one or more communication buses or signal lines 308 for interconnecting these components. Memory 306 may include high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 402 (e.g., network attached storage). Memory 306, or the non-volatile memory devices of memory 306, comprises a non-transitory computer readable storage medium. In some embodiments, memory 306 or the non-transitory computer readable storage medium of memory 306 stores the following programs, modules and data structures, or a subset thereof:

- an operating system 320 that includes procedures for handling various basic system services and for performing hardware dependent tasks;
- a network communication module (or instructions) 322 for connecting the collaboration triggering server system 300 to other computers via the one or more communication network interfaces 304 and one or more communication networks, such as the Internet, other wide area networks, local area networks, metropolitan area networks, and so on;
- event handlers 324 for receiving and processing user communications in accordance established permissions or restrictions, and for comparing the communications with predefined triggering event definitions and/or patterns 326;
- the aforementioned triggering event definitions or patterns 326, which define events and communication patterns that trigger the process of initiating an online collaboration;
- a collaboration invitation generator 328, which generates and sends an invitation to start a new online collaboration;
- a collaboration launcher 330, which builds an online collaboration as described above with respect to operations 212, 214 and 216 of FIG. 2;
- default collaboration configurations 332, which are predefined configurations of online collaborations associated with various types of online collaborations; and
- a related content suggestion engine 334, which is used by the collaboration launcher 330 to provide a user with suggestions of content to include in a new online collaboration.

Examples of triggering event definitions or patterns 326 are as follows:

- An electronic message compose, send, reply sequence where the subject remains constant and the recipient list is constant or changes. This sequence indicates a simple form of collaboration that can trigger the system to offer collaboration as an alternative communication means.
- An electronic message compose, send, and forward sequence, where the subject remains constant. The act of forwarding the message indicates that more people (i.e., the people to whom the message was forwarded) should be involved (or at least should be proposed as potential participants) in the collaboration.
- An electronic message compose and send sequence followed by a telephone call, VOIP call, or an IM (instant message) response that occurs shortly after a recipient reads the initial message. The opposite order is also possible where a telephone call, VOIP call or IM session is followed by an email response, possibly including additional recipients.
- Posting a message or photo (or any piece of content or link) on a blog, web site, message board, online group or the like, followed by the posting of directed comments related to the message or content. This trigger pattern may prompt a suggestion that a collaboration site would be an appropriate way for the participants to continue their dialog.
- At least N email communications or M instant-messaging communications, including a reply to a reply, having a consistent topic that maps to a recognized category in a predefined set of categories, where N and M are numbers greater than two. More generally, some trigger patterns may be complex while others are relatively simple.
- At least two email communications, including a reply, having a consistent topic that produces search results (from a search engine) having a relevancy score above a predefined minimum score (MinimumScore1).

In some embodiments, the text and/or other content in the set of identified communications is processed by the collaboration triggering server system 300 in order to determine one or more of the following: (A) whether the communications are sufficiently related to each other to trigger an invitation to form a collaboration; (B) a best match between the communications and the predefined triggering patterns; (C) a topic, conceptual category or subject of the identified communications, which may then be used to identify candidates for content to be included in an online collaboration.

For example, in some embodiments, the collaboration triggering server system 300 performs a particular process to identify the most important terms in those communications, and to map those terms to topics or conceptual categories. Each word or term in the identified communications may be assigned a content score, which estimates the importance or information content of those terms. Once the highest content score terms the identified communications have been identified, those terms may be mapped to one or more conceptual categories. Alternately, the highest content terms may be treated as the topic-identifying terms of the identified communications. The resulting conceptual categories, or topic-identifying terms, may then be used by the collaboration triggering server system 300 for any the purposes discussed above.

The default collaboration configurations 332 are used by the collaboration launcher 330 to quickly build a robust online collaboration even when the initiating user provides little input to the collaboration launcher 330. The collaboration launcher 330 selects one of the default collaboration configurations 332 in accordance with the topic, category, event or pattern that triggered the initiation of the online collaboration. For instance, some online collaborations may include a calendar, because the participants are planning an event or series of events, while another online collaboration may provide multiple picture displaying regions, but no calendar, because the focus of the online collaboration is photos or other pictures being exchanged by the participants.

The related content suggestion engine 334 may suggest content to a user in accordance with content types associated with one or more default collaboration configurations 332, which in turn may be selected in accordance with the event or pattern that triggered the initiation of the online collaboration.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Figure 4:
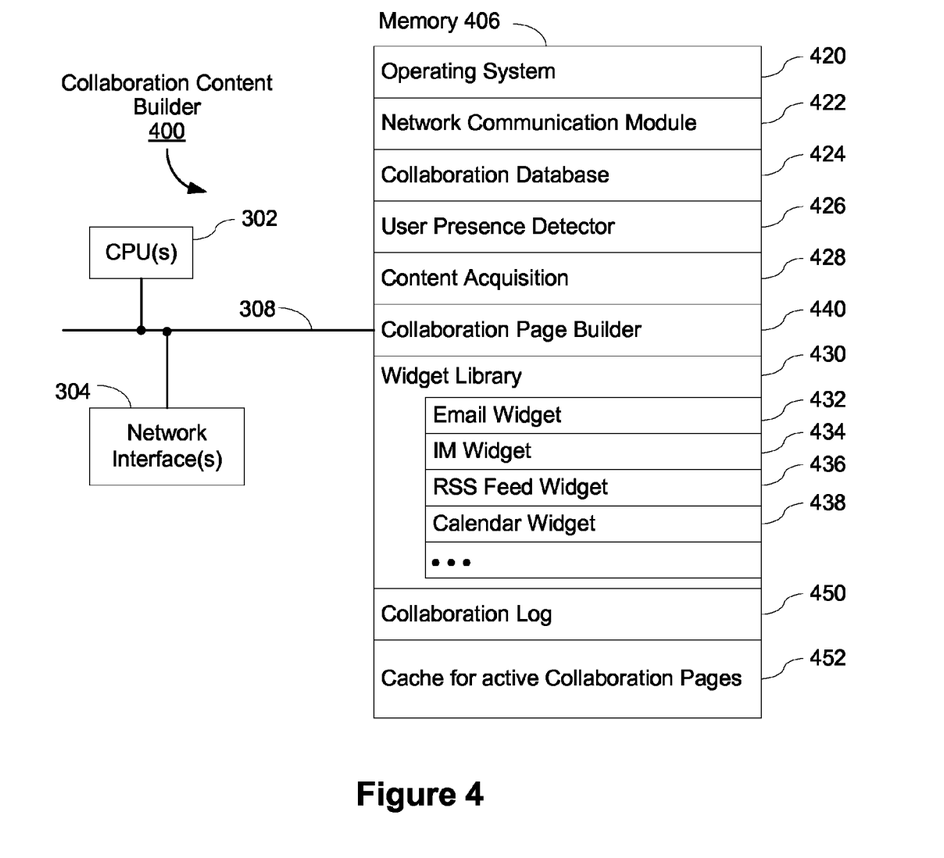
FIG. 4 is a block diagram of an online collaboration content building system in accordance with some embodiments of the invention.

FIG. 4 is a block diagram of collaboration content builder 400. The collaboration content builder 400 includes one or more processing units (CPUs) 402, one or more network or other communications interfaces 404, memory 406, and one or more communication buses or signal lines 408 for interconnecting these components. Memory 406 may include high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402 (e.g., network attached storage). Memory 406, or the non-volatile memory devices of the memory 406, comprises a non-transitory computer readable storage medium. In some embodiments, memory 406 or the non-transitory computer readable storage medium of memory 406 stores the following programs, modules and data structures, or a subset thereof:

an operating system 420 that includes procedures for handling various basic system services and for performing hardware dependent tasks;

a network communication module (or instructions) 422 for connecting the collaboration content builder 400 to other computers via the one or more communication network interfaces 404 and one or more communication networks, such as the Internet, other wide area networks, local area networks, metropolitan area networks, and so on;

a collaboration database 424, with stores records or information indicating the configuration of each online collaboration managed by the collaboration system 108 (FIG. 1); an embodiment of the collaboration database 4242 is described below with reference to FIG. 5;

a user presence detector 426, which determines which participants of active online collaborations are online or logged into the online collaboration system, and may list or otherwise identify the present participants in a region (e.g., a web page region) of the online collaboration;

a content acquisition module 428, which acquires content to be displayed in online collaborations in accordance with the definition or configuration of each of the online collaborations;

one or more collaboration page builders 440, which dynamically generate the web pages of the online collaborations in accordance with the definitions of the online collaborations, the content acquired by the content acquisition module 428, and optionally other information such as participant presence information obtained by the user presence detector 426;

a widget library 430, which are applications or other procedures (sometimes called widgets) for composing web page regions containing certain types of content, such as an email widget 432 for composing, editing, or manipulating the content of an electronic message or message thread, or for performing an action based on the content of an electronic message or message thread;

an optional collaboration log 450, which contains log records of activities that have taken place in the online collaborations (e.g., a log of messages exchanged, documents posted, users joining, users performing various actions, etc.); and a cache for storing active collaboration pages 452 (e.g., pages currently being viewed by users of the online collaborations.

Conceptually, widgets encapsulate automated behavior over a related pool of content. Thus, different widgets may be provided for manipulating, responding to and/or displaying various different types of content. Examples of widgets, in addition to the email widget 432 mentioned above, that may be included in the widget library 430 are an IM widget 434 for composing, editing, manipulating and/or acting upon IM messages or threads; an RSS or Atom feed widget 436 for generating, manipulating and/or acting upon one or more RSS or Atom feeds; a calendar widget 438 for composing, editing, manipulating and/or acting upon calendar or scheduling information; a stock widget (not shown) for manipulating, displaying and/or responding to stock price and/or performance information; a weather widget (not shown) for manipulating, displaying and/or responding to weather condition information; a web cam widget (not shown) for manipulating, displaying and/or responding to web cam video streams. In some embodiments, yet other widgets may be provided for manipulating, responding to and/or displaying other types of content, such as maps, photos, restaurant reviews, product reviews, recipes, and so on.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above.

Figure 5:
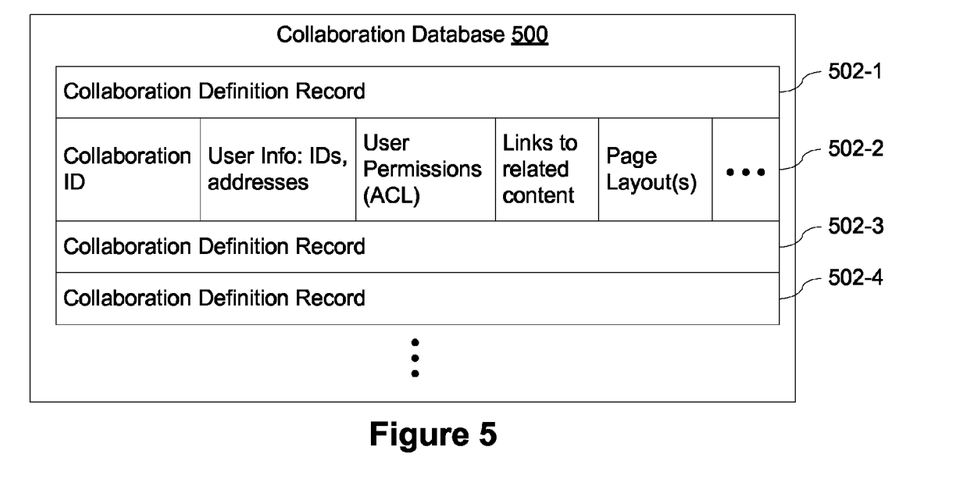
FIG. 5 is a block diagram of a collaboration database in accordance with some embodiments of the invention.

FIG. 5 depicts an embodiment of a collaboration database 500, corresponding to the collaboration database 424 in FIG. 4. The collaboration database 500 includes records 502, each of which defines the configuration of an online collaboration. In an exemplary embodiment, each record 502 includes a collaboration identifier, user information (e.g., identifiers, such as email addresses and names of the collaboration's participants), user permissions (e.g., access control lists for defining the rights of each participant with respect to the content and configuration of the collaboration), links to related content (e.g., links or identifiers of content, or sources of content to be included in the online collaboration), page layouts for the one or more web pages of the online collaboration, and so on. The links to related content may include search queries or the like that, when executed by a search engine, search application or other application, produce content to be displayed in a region of the online collaboration defined by the collaboration's definition record 502. More generally, a link to related content can include a link to virtually any resource that provides content that can be included in an online collaboration or that provides services to the participants of an online collaboration.

FIGS. 4 and 5 are intended more as functional descriptions of the various features which may be present in one or more servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. Furthermore, some of the items shown in FIG. 4 may be implemented, at least in part, on client devices or workstations. In some embodiments, client devices or workstations can include one or more local server modules that respond to requests or queries for information, or which provide services that may be utilized by one or more online collaborations. The actual number of servers or other computers used to implement an information system, and how features are allocated among them, will vary from one implementation to another, and may depend in part on the amount of data traffic that the system must handle during peak usage periods as well as during average usage periods.

Figure 6:
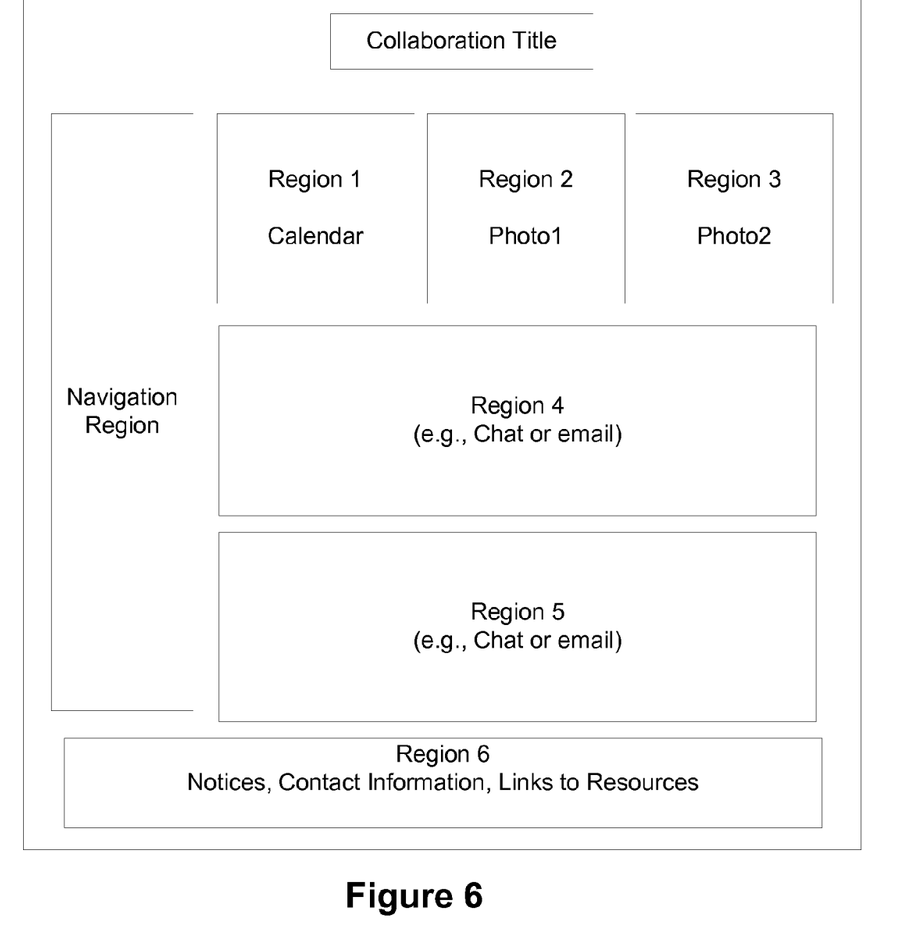
FIG. 6 is a schematic screen shot of a web page for an online collaboration produced by the online collaboration content building system in accordance with some embodiments of the invention.

FIG. 6 is a schematic screenshot of a web page that instantiates an exemplary online collaboration. The web page has multiple regions include a title region; a navigation region, which may contain links to content on other web pages of the collaboration, links to resources outside the collaboration, and links that cause corresponding content to be retrieved and displayed in the web page; and other regions, here labeled Region 1 to Region 6. While these regions of the web page in FIG. 6 have been assigned exemplary content, such as a calendar, photos, chat, email, and notices and contact information, these are merely exemplary. More generally, some regions of the web page may contain static content while others contain dynamic content that is retrieved from a resource, such as a URL, search engine, database, blog, email service, RSS or Atom or similar feed, or the like. Dynamic content may also be generated by an application (sometimes herein called a widget) from the widget library of the collaboration system 108 (FIG. 1), typically using data or information retrieved from a resource or using stored data or information specific to the collaboration (e.g., information stored in cache 452, FIG. 4).

In some embodiments, a region of a collaboration's web page may include advertisements, or links to advertisements.

Figure 7:
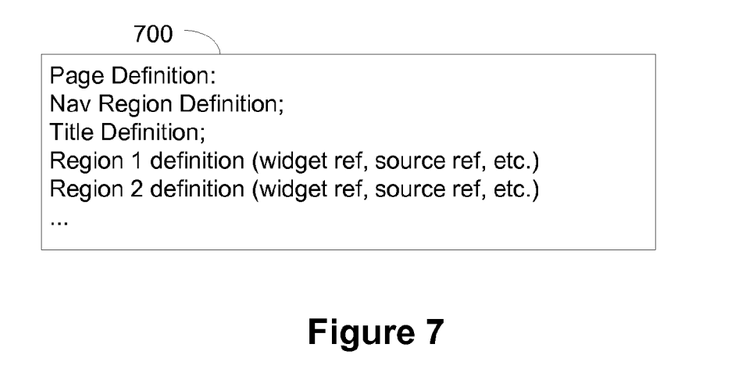
FIG. 7 is a schematic depiction of a collaboration web page definition in accordance with some embodiments of the invention.

FIG. 7 is a schematic depiction of a collaboration web page definition 700 in accordance with some embodiments of the invention. The web page definition 700 may comprise one of the web page layouts of a collaboration definition record 502 in the collaboration database 500. The web page definition 700 may include definitions for multiple regions of a web page. Each region definition may include an indicator of the region type; the web page location of the region (if not predefined by the region type); the widget or application, if any, to be used to generate or retrieve the content to be included in the region; source locator(s), if any, to be included in the region; and other parameters, if appropriate or required. In some embodiments, the web page definition 700 may include a definition for specifying a background color, background image or the like. The format of the web page definition, and the parameters used to define the various regions may vary from one embodiment to another.

Figure 8:
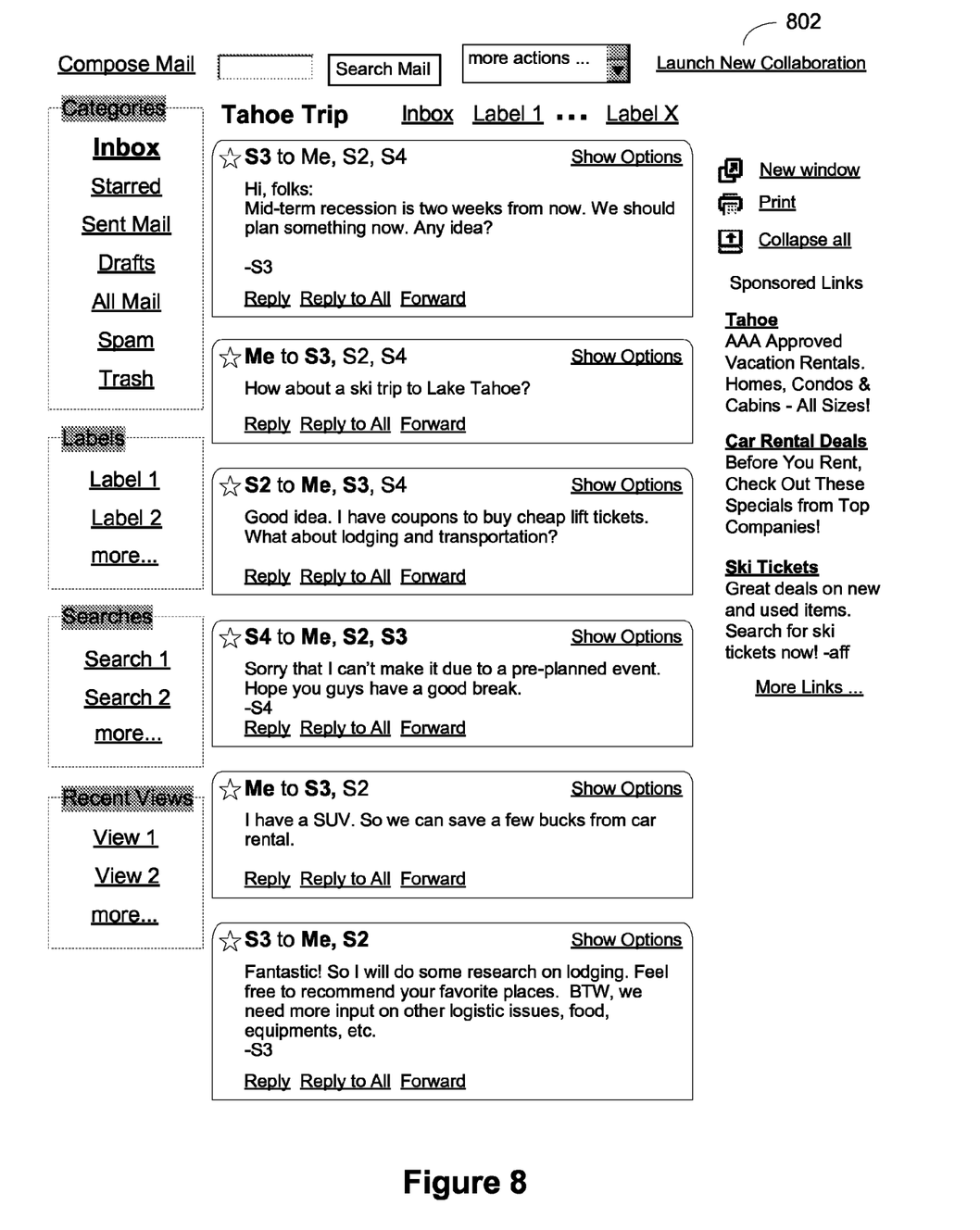
FIG. 8 is a schematic screen shot of an email conversation between four users, including an invitation to produce a corresponding online collaboration, in accordance with some embodiments of the invention.

FIG. 8 is a schematic screen shot of an email conversation between four users, including an invitation to produce a corresponding online collaboration, in accordance with some embodiments of the invention. In this example, the number of communications between the participants, and the consistency of the subject matter being discussed (planning a trip) meets predefined criteria for triggering an online collaboration. As a result, an invitation 802 to form an online collaboration is displayed, in this example in the upper right corner of the displayed page. The manner of presentation of the invitation, such as the text, color, graphics, and display position, may vary from one embodiment to another. In some embodiments, the invitation may appear in a pop-up window or in a dynamically created region of the collaboration web page.

Although one or more of the drawings illustrate a number of logical stages or operations in a particular order, stages or operations which are not order dependent may be reordered and other stages or operations may be combined or broken out. While some reordering or other groupings are specifically mentioned, others will be obvious to those of ordinary skill in the art and so do not present an exhaustive list of alternatives. Moreover, it should be recognized that the operations or logical stages can be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of forming a multi-user online collaboration, comprising:

at a server system having one or more processors and memory storing programs executed by the one or more processors:

receiving and processing a plurality of communications by a plurality of participants, including comparing the plurality of communications with collaboration launch criteria, the collaboration launch criteria including a threshold number of related communications consistent with a topic, the related communications being shared between the plurality of participants;

when a received communication meets the collaboration launch criteria, inviting a respective participant in the received communication to generate the multi-user online collaboration; and generating the multi-user online collaboration upon receipt of a positive response from the respective participant, including initializing the multi-user online collaboration with one or more content items by:
  deriving the topic for the online collaboration from the plurality of communications by the plurality of participants;
  determining a configuration including page layout of the multi-user online collaboration in accordance with the topic for the online collaboration;
  retrieving at least one dynamic content item from a resource in accordance with the topic of the online collaboration, wherein the resource is distinct from the server system;
  incorporating the at least one dynamic content item into the multi-user online collaboration;
  extracting information from communications that occur as part of the multi-user online collaboration; and
  adding an event to a calendar based on the information extracted from the communications.

2. The method of claim 1, wherein the receiving and processing includes:
  identifying a group of communications;
  comparing the group of communications with the collaboration launch criteria; and
  generating a collaborative metric in accordance with a comparison result.

3. The method of claim 1, wherein the receiving and processing includes:
  identifying a group of communications;
  identifying a plurality of topic-characterizing terms from the group of communications;
  comparing the plurality of topic-characterizing terms with the collaboration launch criteria to produce a comparison result; and
  generating a collaborative metric in accordance with said comparison result.

4. The method of claim 3, wherein said inviting includes:
  notifying the respective participant when the collaborative metric is above a predefined threshold; and
  receiving a response from the respective participant.

5. The method of claim 1, wherein retrieving the at least one dynamic content item from the resource further includes:
  defining a query in accordance with the topic of the online collaboration;
  submitting the query to a search engine distinct from the server system; and
  identifying a search result returned by the search engine as the at least one dynamic content item.

6. The method of claim 1, wherein generating the multi-user online collaboration includes:
  a participant operation selected from the group consisting of eliciting from the respective participant a list of potential participants in the multi-user online collaboration, automatically determining a set of potential participants for the multi-user online collaboration, and eliciting from the respective participant acceptance or a revision of an automatically generated list of potential participants for the multi-user online collaboration; and
  a content operation selected from the group consisting of eliciting from the participant a set of content components of the multi-user online collaboration, automatically identifying the set of content components for the multi-user online collaboration, and eliciting from the participant acceptance or a revision of an automatically generated set of content components for the multi-user online collaboration; and
  notifying the potential participants of the multi-user online collaboration.

7. The method of claim 1, including associating with each potential participant a respective participant privilege.

8. The method of claim 1, wherein generating the multi-user online collaboration includes:
  identifying a list of potential participants from the plurality of participants in the plurality of communications;
  identifying a set of candidate content components based on the plurality of communications; and
  notifying the potential participants of the multi-user online collaboration.

9. The method of claim 1, wherein the multi-user online collaboration includes links to multiple content items.

10. The method of claim 9, wherein at least one of the multiple content items is automatically selected in accordance with content of an identified group of communications in the received plurality of communications.

11. The method of claim 1, wherein the plurality of communications include one or more email messages, instant message (IM) messages, calendar events, blog posts, photograph postings, online comment postings, search engine searches, web page interactions, short message service (SMS) transmissions, or a combination thereof.

12. The method of claim 1, wherein the receiving and processing includes comparing content, if any, attached to one or more received communications with the collaboration launch criteria.

13. The method of claim 1, wherein the collaboration launch criteria include a plurality of distinct triggering patterns.

14. The method of claim 1, including responding to the positive participant response by generating the multi-user online collaboration in accordance with a default configuration.

15. The method of claim 1, including responding to the positive participant response by eliciting information from the participant concerning the plurality of participants and content of the multi-user online collaboration, and then generating the multi-user online collaboration in accordance with the elicited information.

16. The method of claim 1, wherein the one or more content items include content items retrieved from a plurality of sources, based on a personalized online collaboration configuration associated with the participant.

17. A computer system for forming a multi-user online collaboration, comprising:
  main memory;
  one or more processors; and
  at least one program, stored in the main memory and executed by the one or more processors, the at least one program including instructions for:
    receiving and processing a plurality of communications by a plurality of participants, including comparing the plurality of communications with collaboration launch criteria, the collaboration launch criteria including a threshold number of related communications consistent with a topic, the related communications being shared between the plurality of participants;
    inviting a respective participant in the received communication to generate the multi-user online collaboration when a received communication meets the collaboration launch criteria; and
    generating the multi-user online collaboration upon receipt of a positive response from the respective participant, including initializing the multi-user online collaboration with one or more content items by:

deriving the topic for the online collaboration from the plurality of communications by the plurality of participants;

determining a configuration including page layout of the multi-user online collaboration in accordance with the topic for the online collaboration;

retrieving at least one dynamic content item from a resource in accordance with the topic of the online collaboration;

incorporating the at least one dynamic content item into the multi-user online collaboration;

extracting information from communications that occur as part of the multi-user online collaboration; and adding an event to a calendar based on the information extracted from the communications.

18. The computer system of claim 17, wherein the one or more content items include content items retrieved from a plurality of sources, based on a personalized online collaboration configuration associated with the respective participant.

19. The computer system of claim 17, wherein the instructions for receiving and processing include instructions for:
identifying a group of communications;
comparing the group of communications with the collaboration launch criteria; and
generating a collaborative metric in accordance with said comparison result.

20. The computer system of claim 17, wherein the instructions for receiving and processing include instructions for:
identifying a group of communications;
identifying a plurality of topic-characterizing terms from the group of communications;
comparing the plurality of topic-characterizing terms with the collaboration launch criteria to produce a comparison result; and
generating a collaborative metric in accordance with said comparison result.

21. The computer system of claim 20, wherein the instructions for inviting further include instructions for:
notifying the respective participant when the collaborative metric is above a predefined threshold; and
receiving a response from the respective participant.

22. The computer system of claim 17, wherein the instructions for retrieving the at least one dynamic content item from the resource further include instructions for:
defining a query in accordance with the topic of the online collaboration;
submitting the query to a search engine distinct from the server system; and
identifying a search result returned by the search engine as the at least one dynamic content item.

23. The computer system of claim 17, wherein the instructions for generating the multi-user online collaboration further include instructions for:
a participant operation selected from the group consisting of eliciting from the respective participant a list of potential participants in the multi-user online collaboration, automatically determining a set of potential participants for the multi-user online collaboration, and eliciting from the respective participant acceptance or a revision of an automatically generated list of potential participants for the multi-user online collaboration; and
a content operation selected from the group consisting of eliciting from the participant a set of content components of the multi-user online collaboration, automatically identifying the set of content components for the multi-user online collaboration, and eliciting from the participant acceptance or a revision of an automatically generated set of content components for the multi-user online collaboration; and
notifying the potential participants of the multi-user online collaboration.

24. A non-transitory computer readable storage medium storing one or more programs for execution by one or more processors of a computer system, the one or more programs comprising instructions that, when executed by the computer system, cause the computer system to:
receive and process a plurality of communications by a plurality of participants, including instructions for comparing the plurality of communications with collaboration launch criteria, the collaboration launch criteria including a threshold number of related communications consistent with a topic, the related communications being shared between the plurality of participants;
invite a respective participant in the received communication to generate a multi-user online collaboration when a received communication meets the collaboration launch criteria; and
generate the multi-user online collaboration upon receipt of a positive response from the respective participant, including initializing the multi-user online collaboration with one or more content items by:
deriving the topic for the online collaboration from the plurality of communications by the plurality of participants;
determining a configuration including page layout of the multi-user online collaboration in accordance with the topic for the online collaboration;
retrieving at least one dynamic content item from a resource in accordance with the topic of the online collaboration;
incorporating the at least one dynamic content item into the multi-user online collaboration;
extracting information from communications that occur as part of the multi-user online collaboration; and
adding an event to a calendar based on the information extracted from the communications.

25. The non-transitory computer readable storage medium of claim 24, wherein the one or more content items include content items retrieved from a plurality of sources, based on a personalized online collaboration configuration associated with the respective participant.

26. The non-transitory computer readable storage medium of claim 24, wherein the receiving and processing include:
identifying a group of communications;
comparing the group of communications with the collaboration launch criteria; and
generating a collaborative metric in accordance with a comparison result.

27. The non-transitory computer readable storage medium of claim 24, wherein the receiving and processing include:
identifying a group of communications;
identifying a plurality of topic-characterizing terms from the group of communications;
comparing the plurality of topic-characterizing terms with the collaboration launch criteria to produce a comparison result; and
generating a collaborative metric in accordance with said comparison result.

28. The non-transitory computer readable storage medium of claim 27, wherein the inviting includes:
notifying the respective participant when the collaborative metric is above a predefined threshold; and receiving a response from the respective participant.

29. The non-transitory computer readable storage medium of claim 24, wherein retrieving the at least one dynamic content item from the resource includes:

defining a query in accordance with the topic of the online collaboration;

submitting the query to a search engine distinct from the server system; and     identifying a search result returned by the search engine as the at least one dynamic content item.

30. The non-transitory computer readable storage medium of claim 24, wherein generating the multi-user online collaboration includes:

a participant operation selected from the group consisting of eliciting from the respective participant a list of potential participants in the multi-user online collaboration, automatically determining a set of potential participants for the multi-user online collaboration, and eliciting from the respective participant acceptance or a revision of an automatically generated list of potential participants for the multi-user online collaboration; and     a content operation selected from the group consisting of eliciting from the participant a set of content components of the multi-user online collaboration, automatically identifying the set of content components for the multi-user online collaboration, and eliciting from the participant acceptance or a revision of an automatically generated set of content components for the multi-user online collaboration; and     notifying the potential participants of the multi-user online collaboration.

\* \* \* \* \*